Jan. 17, 1928.
P. KAPITZA
1,656,203
ELECTRIC STORAGE APPARATUS
Filed Aug. 26, 1924
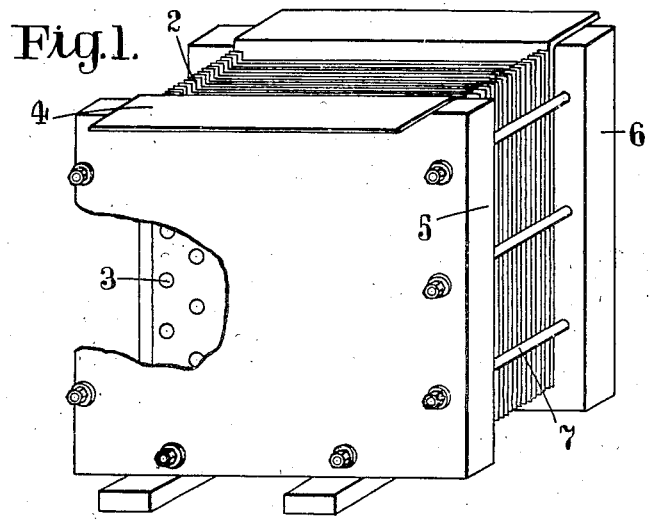
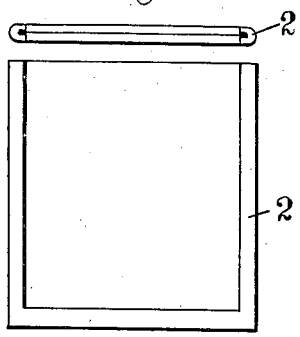
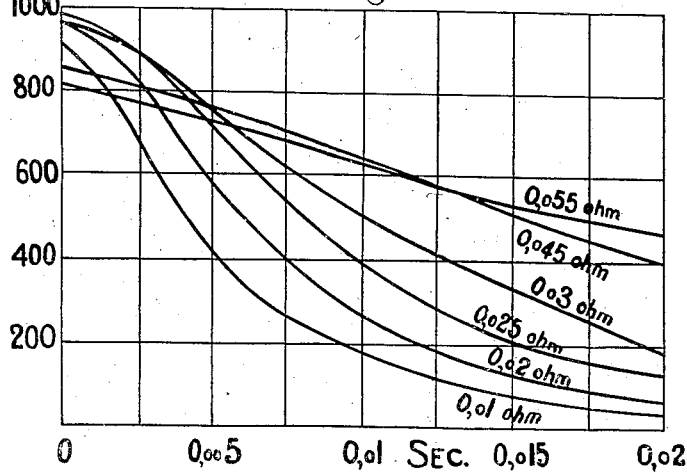
INVENTOR
P. Kapitza
BY
ATTORNEY Patented Jan. 17, 1928.

1,656,203

UNITED STATES PATENT OFFICE.

PIERRE KAPITZA, OF CHESTERTON, ENGLAND.

ELECTRIC STORAGE APPARATUS.

Application filed August 26, 1924, Serial No. 734,289, and in Great Britain September 5, 1923.

This invention relates to electric storage apparatus and has for its object to provide a device adapted to yield its output in a very brief period of time but at correspondingly high electric power and correspondingly high current density.

A further object of the invention is to provide means whereby momentary magnetic fields of very high intensity may be obtained. A further object of the invention is to render possible the production of flash discharges and high magnetic fields by means of apparatus of comparatively small and easily manageable dimensions.

The invention primarily comprises a "flash" discharge accumulator adapted to have its terminals short circuited repeatedly without danger to the structure of the device.

The invention is illustrated in the accompanying drawing showing a preferred form in which:

Fig. 1 shows diagrammatically a battery constructed according to the invention,

Fig. 2 is a face view of a plate detached.

Fig. 3 illustrates a chart showing the output of a battery formed in accordance with this invention.

Referring now to the drawing, the battery 1 comprises seventy-one plates of chemically pure lead 35 centimetres square and 1.5 millimetres thick arranged in a pile. The plates are held apart round their edges by U-shaped india rubber washers 2 which are channelled in cross section as shown more clearly in Fig. 2. Intermediate their edges they are held apart by circular discs 3 of india rubber attached to the plates by india rubber solution, thirty discs being used in each cell of a diameter of about 1.5 centimetres and a normal uncompressed thickness of 1.7 millimetres. The two end plates of lead are of substantial thickness and provided with extensions 4 bent over to provide means for the attachment of terminals to connect the leads. The pile thus constructed is held between two thick slabs 5, 6 of solid slate held together by bolts 7, the plates 5, 6 and bolts being covered with tar varnish to protect them from the acid. The gap between the plates is filled with 25–35 per cent solution of sulphuric acid to about $\frac{9}{10}$ ths of its height.

The battery thus comprises a number of cells separated by bi-polar electrodes which serve as regards one face as a positive for one cell and as regards the opposite face as a negative for the adjoining cell. Owing to the fact that the current passes through the electrodes transversely to the faces thereof the resistance in the electrodes is reduced to a minimum, and owing to the electrodes being set very close together and to the area of the distance pieces being comparatively small compared with the area of the electrode exposed to electrolyte, the electrolytic resistance is also very small.

Further, since the current in adjoining electrodes does not pass in parallel planes there is little force of attraction or repulsion between adjoining electrodes and the risk of buckling or rupture of the electrodes is reduced a minimum.

The battery is charged for a brief time only and its capacity is small owing to the small depth of active layer of oxide permitted to be formed. In use 4 batteries formed as above having an initial internal resistance of .02 ohms each and charged in parallel from a source of electricity giving a current of two or three amperes at 220 volts, yielded a power on discharge through a resistance of .02 ohms a power of over 1,000 kilowatts. Under suitable conditions the current on discharge could be increased to 7,000 amperes and by short circuiting the accumulators could be raised to 13,000 or 14,000 amperes.

The chart illustrated in Fig. 3 shows various curves obtained by means of an oscillograph illustrating the power yielded by 4 accumulators in discharging in two groups in parallel of two accumulators connected in series through various resistances between .055 and .12 ohms, the ordinates representing the power and the abscissæ fractions of a second. It will be seen that maximum power was obtained when the external resistance was .025 ohms, but that with the lower external resistances the duration of the power output was considerably less than with the high resistance. In practice, the latter conditions are therefore probably of restricted value being limited to flashing lamps, or fusing wires and not appropriate to the production of magnetic fields; and in using the accumulator to produce magnetic fields therefore the period of duration for which the field is required is an important factor in determining the circuit.

It is to be understood that the above figures are merely illustrative of the factors obtainable with a battery in fairly good order since the battery in continuous use tends to deteriorate as would only be expected. In respect of a battery in continuous use for about twelve months the power obtainable gradually diminished throughout this period from 1200 kilowatts to 700 kilowatts, and the time necessary for recharging after complete discharge increased from 2 minutes to 20 minutes during the same period. By this means it is possible to arrange that the primary circuit is again broken off about one thousandth to one hundredth of a second after contact has been made. In practice the actual break is preferably made by means of a fuse wire connected in parallel with the second switch so as to give a clean break.

Although in the preferred form I have described the invention as applied to a lead cell, it is not to be understood as limited thereto, as we may if desired make use of an Edison cell using iron sheets which are nickel plated on one side.

I am of course aware that it is not broadly new to construct for ordinary use a battery of a pile of lead plates forming bi-polar electrodes the intervening spaces being filled with acid and constituting separate cells arranged in series across the width of the battery. So far as I am aware however it is new to construct such a battery with the electrodes placed close together so as to give on discharge high amperages and power multiplication of the order described.

For the production of magnetic fields such as are adapted for use with percussive tools it is sufficient to connect two co-axial coils through a switch across the terminals of the battery.

On closing the switch an attractive force of two to three tons can be obtained from a single accumulator of the dimensions set forth above.

I claim:—

1. An electric storage device comprising thin sheets of pure lead arranged in a pile with their faces very close together, small thin insulating spacing disks between adjoining sheets, liquid retaining insulating packing separating adjoining sheets along three edges, end slabs of substantial thickness and rigidity, transverse bolts holding the pile and end slabs together, and electrolyte contained within the cells between adjacent sheets.

2. An electric storage device comprising thin sheets of pure lead arranged in a pile with their faces very close together, small thin insulating rubber spacing disks between adjoining sheets, liquid retaining rubber packing separating adjoining sheets along three edges, end slabs of substantial thickness and rigidity, transverse bolts holding the pile and end slabs together, and electrolyte contained within the cells between adjacent sheets.

In testimony whereof I affix my signature.

PIERRE KAPITZA.